Sept. 20, 1927.  
W. J. MILLER  
1,642,966  
APPARATUS FOR PRODUCING MOLD CHARGES OF MOLTEN GLASS  
Filed Dec. 29, 1925   3 Sheets-Sheet 1

INVENTOR.  
William J. Miller  
BY Robson D. Brown  
ATTORNEY.

Sept. 20, 1927.  1,642,966
W. J. MILLER
APPARATUS FOR PRODUCING MOLD CHARGES OF MOLTEN GLASS
Filed Dec. 29, 1925  3 Sheets-Sheet 3

INVENTOR.
William J. Miller
BY Robson D. Brown
ATTORNEY.

Patented Sept. 20, 1927.

1,642,966

UNITED STATES PATENT OFFICE.

WILLIAM J. MILLER, OF SWISSVALE, PENNSYLVANIA, ASSIGNOR TO HARTFORD-EMPIRE COMPANY, OF HARTFORD, CONNECTICUT, A CORPORATION OF DELAWARE.

APPARATUS FOR PRODUCING MOLD CHARGES OF MOLTEN GLASS.

Application filed December 29, 1925. Serial No. 78,114.

My invention relates to the production of mold charges of molten glass.

One of the novel and improved features of my present invention is a new and improved shear mechanism wherein the shear blades are mounted to slide toward and from each other.

In the specific embodiment of the principles of my invention illustrated herein, one of the shear-blades is reciprocated directly by the actuating means, shown as a fluid-pressure cylinder and piston mechanism while the other shear-blade is reciprocated in the opposite manner through a rack-bar and pinion device.

I also provide a new and improved character of shear blades.

I also provide new and improved means for providing resilient pressure between the shear blades at the point of cutting.

Another feature of my present invention is a new and improved discharge-outlet construction for the boot or shallow extension of the glass-melting tank or other container.

Another feature of my present invention is a new and improved blow-back mechanism.

Another feature of my present invention is a new and improved combined blow-back and shear mechanism.

Other novel features of construction, and also of arrangement of parts, will appear from the following description.

In the accompanying drawings, wherein I have illustrated the best embodiment of the principles of my invention now known to me.

Referring to the drawings, 1 represents the boot or shallow extension of a continuous glass tank, the inner walls and floor of the boot being formed of the refractory blocks or "stones" 2 supported by an outer metal casing 3 with interposed plates 4 of asbestos or other heat-insulating material.

The floor of the casing 3 is provided with a circular opening 5 while the floor-stone 2 and the bottom plate 4 are provided with axially alined openings of less diameter.

6 is a clay liner or bushing which fits the alined openings with its lower end flush with the under surface of the casing 3 while its upper end extends somewhat above the floor of the boot to take the wear, the liner being renewable. 7 is a ring of heat-insulating material which lines the opening 5 of the casing 3. The bore of the liner is preferably downwardly tapered, as shown.

8 represents a clay implement, employed to control the discharge of molten glass and disposed vertically and in alinement with the outlet of the boot.

Said implement may be arranged to function as a valve which closes the outlet when the mechanism is out of use and which is elevated to open the orifice while the mechanism is in use, the elevation of the raised implement being adjusted to regulate the volume of discharge.

However I prefer to arrange the implement 8 for reciprocal movement relative to the discharge outlet of the boot, the same operating in timed relation to the shears. I do not show means for reciprocating and for timing the reciprocation of the implement, but for suitable means for such purposes I refer to my pending patent application, Serial Number 325,616, filed in the United States Patent Office on September 23rd, 1919.

Figures 2, 3:
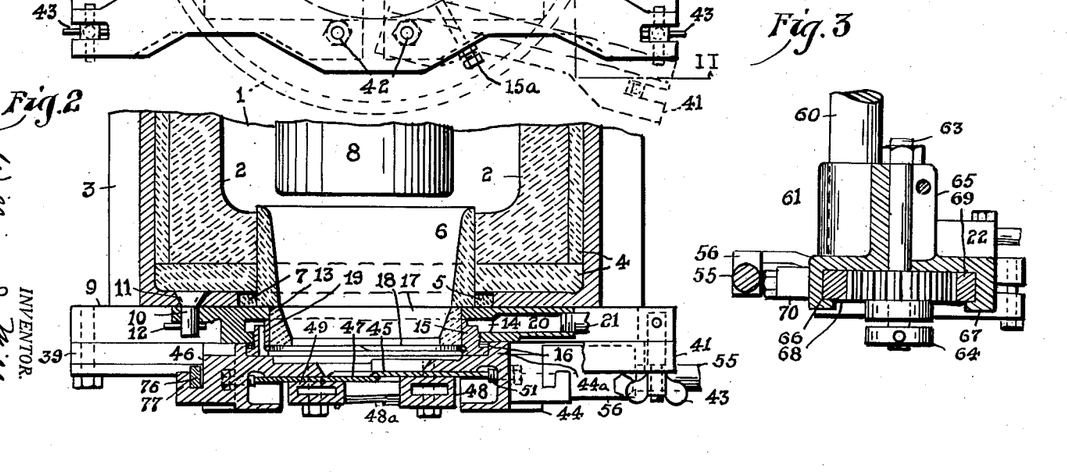
Fig. 2 is a vertical section of the boot and its discharge outlet and also of the shear mechanism, the section of the latter being taken along the irregular line II—II in Fig. 1.
Fig. 3 is a detail in section along the irregular line III—III in Fig. 1.

9 represents a bed plate which is detachably secured to the underside of the boot by means of dowels 10 depending from the casing 3 and extending through holes 11 in the bed plate, said dowels being provided with diametrically disposed slots into which the clamp or wedge members 12 are driven bearing against the under side of the bed plate and thus wedging it flatly and rigidly against the under side of the boot. One of said dowels is shown in Fig. 2 and I provide a second dowel on the other side of the outlet of the boot. By knocking out the members 12 the bed plate is released.

The bed plate 9 has a central circular opening 13 which registers with the outlet opening of the boot, the diameter of the upper portion of said opening being less than the exterior diameter of and greater than the bore diameter of the liner 6, so that the plate 9, when in place supports the liner 6 in position, and when the plate is removed, the liner may be readily removed and replaced.

The lower portion of the opening 13 is of increased diameter and is internally threaded, while the intermediate portion of the opening is grooved out as shown, providing for, when the parts are assembled, an annular chamber 14. 15 is a metal ring-nut whose bore diameter is the same as that of the upper portion of the opening 13 and whose perimeter is threaded and screws into the threaded lower portion of the opening 13. The ring-nut 15 is provided at its lower end with a perimetral flange and between said flange and the lower surface of the plate 9 are interposed the metal split rings 16 for a purpose to be described. When in place the ring-nut closes the groove thus completing the annular chamber 14. 15$^a$ is a set bolt which is screwed through a threaded hole in the plate 9 and impinges against the nut 15 to prevent its accidental rotation.

17 is the clay orifice bushing which forms the lower portion of the discharge outlet of the boot and which is interchangeable to provide for various diameters for the column of discharged glass, the bore of the bushing determining the diameter of the column. The bushing 17 fits in the bore of the ring nut and also in the upper portion of the opening 13 and against the lower end of the liner 6. The bushing is removably held in place. I provide for this purpose a split spring ring 18 which is sprung into place in a groove in the bore of the nut 15 near its lower end and supports the bushing from below. The bushing is inserted and the ring 18 sprung into place. Again the spring is contracted and removed and the bushing may then be taken out.

The nut 15 is provided with a plurality of vertical ports 19 arranged in annular series and communicating at their upper ends with the chamber 14 while their lower ends extend below the orifice bushing 17.

20 represents a passage leading horizontally through the plate 9, with its inner end communicating with the chamber 14 and its outer end threaded for the connection of the compressed air-supply pipe 21.

22 represents a valve casing having a central chamber 23 and at either side the alined passages 24 and 25. At the inner end of each of said passages is a valve seat connecting the passage with the chamber 23, and 26 is a ball which is adapted to engage either seat and thus seal off either the passage 24 or 25 from the chamber 23. The chamber 23 is connected by a port 27 and a pipe 28 with a tank 29 intended to supply compressed air for the blow-back. The capacity of the tank may be regulated by means of the false head 30 which may be adjusted by the screw shaft 31 whose inner end is connected to the head 30 and which is screwed through a threaded hole in the end of the tank 29. The tank is provided with a pressure gauge 32.

The pipe 21 is connected to a port 33 in the valve casing intersecting the passage 24, while a pipe 34, in which there is maintained a supply of compressed air at suitable pressure, is connected to a port 35 intersecting the passage 25. 34$^a$ is an automatic and adjustable pressure reducing valve interposed in the pipe 34 to maintain the desired pressure.

The ball 26 is normally maintained in and returned to the position wherein it closes the inner end of the passage 24, while the inner end of the passage 25 is open, thus providing communication between the compressed air supply pipe 34 and the tank 29. Thus I have shown the outer end of the passage 25 open and threaded to receive an adjustable abutment screw 36 against the inner end of which bears the outer end of a helical spring 37 in the passage 25, the inner end of the spring bearing against the ball 26. The ball 26 is at proper intervals moved into the position, shown in Fig. 9, wherein it opens the inner end of the passage 24 and closes the inner end of the passage 25, thus establishing communication between the tank 29 and the chamber 14. Thus 38 is a striking pin slidably mounted in the restricted outer end of the passage 24 and protruding therefrom while its inner end bears against the ball 26. It is evident that when the pin 38 is driven inwardly, the ball 26 will be shifted to establish communication between the tank 29 and the blow-back chamber 14.

Figure 1:
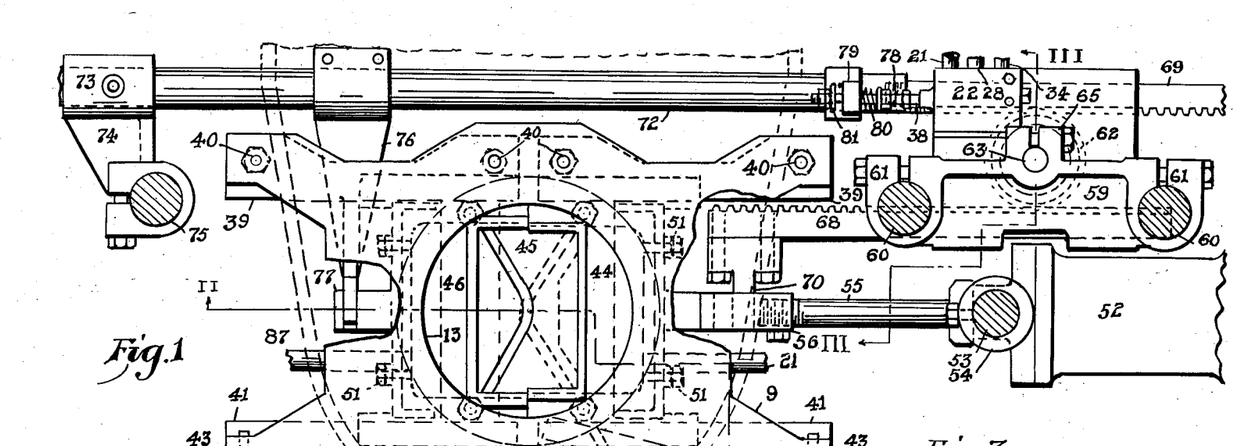
Fig. 1 is a plan view of the bed-plate and the shears and also of the operative mechanism for the latter, the bed-plate being broken away in part.
Figures 4, 5, 6, 7, 8, 9:
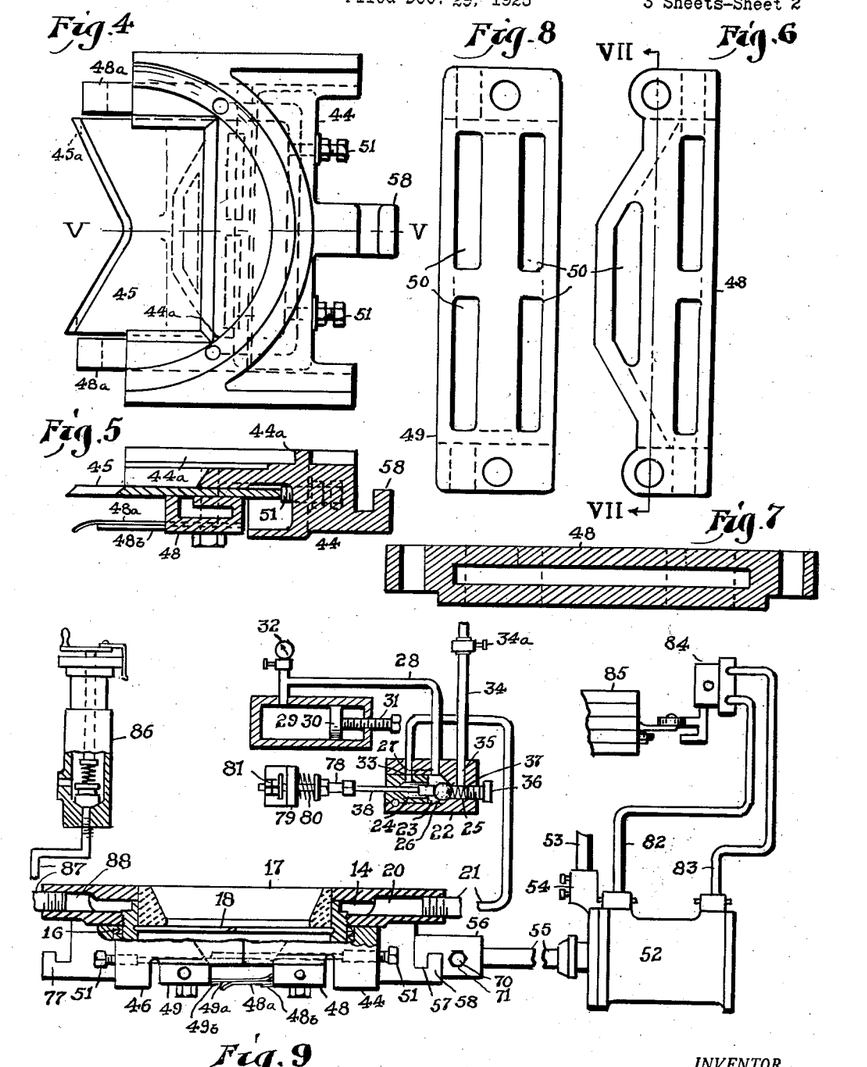
Fig. 4 is a plan view of one of the shear blade holders, being the holder for the upper shear blade, which is shown at the right in Figs. 1 and 2.
Fig. 5 is a section taken along the line V—V in Fig. 4.
Fig. 6 is an enlarged plan of the clamping plate used to attach the shear blade to said holder.
Fig. 7 is a section taken along the line VII—VII in Fig. 6.
Fig. 8 is a view similar to Fig. 6 but showing the clamping plate of the other shear blade holder.
Fig. 9 is a diagrammatic view, partially in section, indicating the method of automatically operating the shears and the blow-back.

The perimetral contour of the bed plate 9 is preferably substantially that shown in Figs. 1, 2 and 9. 39 represents a pair of alined undercut guide bars attached along one side of the plate 9, as by the bolts 40. Parallel to and in spaced relation therewith are a second pair of guide bars 41 whose inner or adjacent ends are connected to the plate 9, as by the bolts 42 while the outer ends of the bars 41 are slotted to be engaged by the swing-bolts 43 carried by the plate 9. It is evident that by disengaging the swing bolts therefrom, the guides 41 may be swung outwardly with the bolts 42 as pivots, as indicated in dotted lines in Fig. 1, thus facilitating the insertion and removal of the shear blade carriers in the slideways formed by the two pair of guide bars 39 and 41.

44 is the holder for the upper shear blade 45, while 46 is the holder for the lower shear blade 47. The holders are slidably mounted in the slideway formed by the bars 39 and 41 to move toward or away from each other beneath the plate 9.

The shear blade 45 is secured to the under side of the holder 44 by a clamp-plate 48 which is transversely disposed below the blade and has its ends bolted to the holder. Similarly the shear blade 47 is clamped to the under side of its holder 46 by means of the clamp plate 49. The clamp plates 48 and 49 are chambered for the maintenance of a current of water therethrough, and the top walls of said chambers may be apertured, as indicated at 50, to admit the moisture to the surfaces of the shear blades. The shear blades may be nicely adjusted on the holders by means of adjustment screws 51 screwed in a threaded hole in the holder and impinging on the rear edge of the blade. It is evident that by first loosening its clamp-plate, the position of the blade relative to the holder may be accurately adjusted, thus obtaining and maintaining proper coaction between the blades.

The holders 44 and 46 are each provided with semi-annular shoulders 44$^a$ and 46$^a$, respectively, on their top surfaces, which shoulders, when the shears close, form an annular closure which bears against the rings 16, compressing the same and forming a pressure-tight joint. Thus when the shear-blades are in their closed position the lower end of the discharge outlet of the boot is closed against the escape of blow-back pressure.

52 represents a horizontally disposed fluid pressure cylinder which is supported from above by means of a standard 53 depending from a fixed portion of the tank or boot structure and fixed, as by set screws in the socket 54 cast integral with the front head of the cylinder 52.

To insure resilient engagement and sliding contact of the cutting edges of the shear blades I provide leaf-springs 48$^a$ at either side of the shear blade 45, bolted to the under side of the clamp plate 48 by the same bolts which clamped the said plates to the holders, and extending forwardly to engage in sliding contact with similar leaf-springs 49$^a$ mounted on the clamp plate 49. The leaf springs are preferably reinforced by the spring leaves 48$^b$ and 49$^b$, respectively. The opposed leaf-springs are bowed or curved in opposite directions to facilitate their contact. It will be noted that the leaf-spring associated with the upper shear blade bears from beneath upon the leaf spring associated with the lower shear blade, thereby resiliently compressing the shear blades together. The bowing of the engaged leaf-springs in opposite directions insures the maximum compression on a line diametric of the axis of the column of glass and at right angles to the path of movement of the shear blades as they approach during the cutting operation.

As will be noted, the type of shear blades employed is preferably that having V-notched cutting edges. It is difficult to maintain proper contact at the cutting points at both sides with notched shears. The blades tend to separate at one side and come into close contact at the other. Therefore I provide the spring compression means at both sides of the blades, thereby insuring and maintaining snug resilient contact at both points of cutting during the converging movement of the blades.

Figure 10:
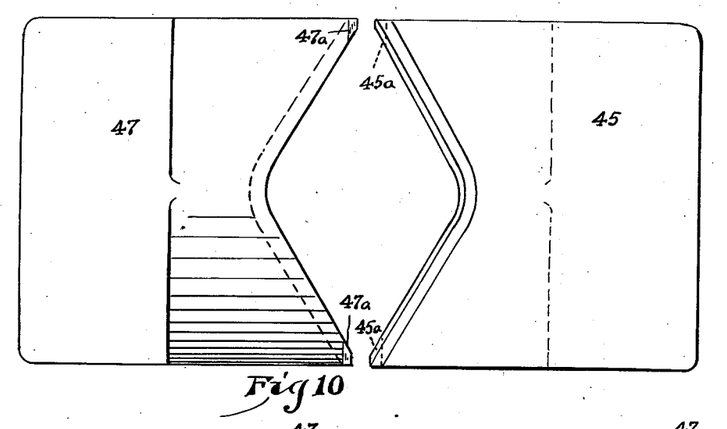
Fig. 10 is a view in plan showing the two shear blades.
Figure 11:
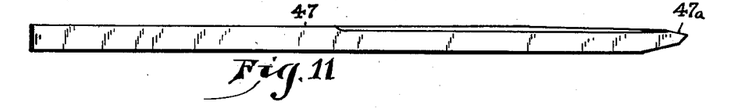
Fig. 11 is an enlarged edge view of the left hand or lower shear blade.
Figure 12:
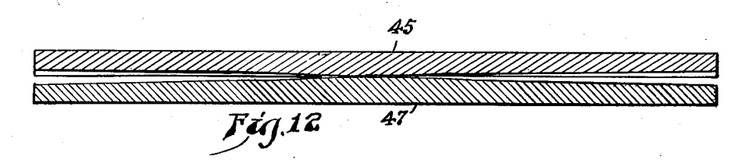
Fig. 12 is a diagrammatic view on enlarged scale in section illustrating substantially the relation of the two blades at the completion of the cut.

The shear blades 45 and 47 are of the form illustrated in Figs. 10, 11 and 12. The butts of the blades or the portions engaged by the clamp plates preferably have flat and parallel top and bottom surfaces so as to readily clamp flat against the holder. The forwardly projecting portions of the blades are formed with their working or contact surfaces slightly convexed from side to side, as shown, the upper shear blade having its convexed surface below and the other blade having its convexed surface above. The convexed surfaces mate in sliding contact as the blades converge, thus obtaining a wiping contact at the two points of contact as the V-shaped cutting edges move up on each other toward the common center where the apices of the V-shaped edges finally meet to complete the cut. The entire compression acting between the blades is always exerted at the meeting points of the cutting edges.

If the mating surfaces of the shear blades were flat or in true parallel planes there would be no wiping or pressure contact between the cutting edges at the points of contact. The points or outer extremities of the V-shaped cutting edges are beveled on the contact side of the blades, as shown at 45$^a$ and 47$^a$, respectively, thus preventing the blades striking each other head-on as they meet and causing the upper blade to mount the lower blade.

The piston rod 55, which is attached to the piston of the cylinder 52, is provided with a block 56 which has a downturned hook 57 interlocked with an upturned hook 58 on the rear center of the blade holder 44. It is thus evident that an outward movement of the piston rod moves the shear blade 45 into cutting position while a retractive movement of the piston rod retracts the shear blade into its inoperative position.

59 is a housing casting supported from above by one or more standards 60 which depend from a fixed portion of the tank or boot structure, having their lower ends clamped in the split sockets 61 of the housing casting.

A pinion 62 is rotatably mounted on a vertically disposed shaft 63, being held thereon by the collar 64 pinned on the lower end of said shaft. The upper end of the shaft 63 is clamped in the split collar 65 of the housing 59. On opposite sides of the pinion 62, the housing 59 is provided with the slideways 66 and 67 in which the rack-bars 68 and 69 are mounted, respectively, said rack-bars meshing with the pinion 62 at its opposite sides and thus moving in opposite directions while the pinion rotates.

At its forward end the rack-bar 68 is provided with a finger 70 extending at right angles to the bar and fitting in a hole 71 in the block 56. Thus the rack-bar 68 reciprocates in unison with the piston rod 55 and rotates the pinion 62 first in one direction and then in the other, and simultaneously the pinion imparts to the rack-bar 69 a reciprocal movement which is the opposite to that of the rack-bar 68.

The rack bar 69 is rigidly attached at its front end to an alined bar 72, as by screwing the threaded end of the rack-bar into a socket in the bar 72 whose outer end is journaled in the slide bearing 73 in a bracket 74 clamped to the depending standard 75.

The bar 72 is provided with a laterally extending finger 76 which engages the hook 77 on the rear of the blade-holder 46.

It is thus evident that the reciprocable movement of the piston in the cylinder 52 imparts a reciprocal movement to both shear-blades but of opposite characters.

The finger 76 is adjustable along the bar 72, thus providing means for regulating the relative closing position of the shear blades.

The valve 22 may be conveniently mounted on the housing 59 with its striking-pin 38 in the path of a spring-mounted tappet-rod 78 carried by the bar 72 and so arranged that as the shear-blades close and detach the mold charge, the rod 78 drives in the pin 38, thus cutting off communication between the compressed air supply pipe 34 and the tank 29 and establishing communication between the tank and the chamber 14 and the ports 19, thereby causing the application of a puff of compressed air or the "blow-back" to the lower end of the outlet, thereby positioning or causing the retraction of the sheared stub of glass within the outlet. As the shears start to open, the rod 78 moves out of contact with the pin 38, thus permitting the spring 37 to shift the ball 26, thereby cutting off the communication between the tank 29 and the outlet, and establishing communication between the pipe 34 and the tank for replenishing the tank with a supply of compressed air.

The intensity of the blow-back may be regulated by adjusting the pressure-reducing valve 34$^a$ and the volume thereof by adjusting the false-heads 30 in the tank. The instant of application of the puff of compressed air may be adjusted by regulating the tappet-rod 78.

Thus the rod 78 is inserted through a hole in an angular bracket 79 mounted on the bar 72, a spring 80 being coiled about the rod 78 between its head and said bracket, while a nut 81 is screwed on the rod against the opposite face of the bracket. Thus the projection of the rod toward the pin 38 may be regulated, the greater the extension of the rod past the bracket the sooner the impingement of the rod on the pin and the more prolonged its engagement therewith.

The spring 37 insures the reseating of the ball 26 to close the inner end of the passage 24 when the shears start to reopen. The spring 80 provides a resilient contact between the rod 78 and the pin 38, thus allowing for expansion of the parts and also for misadjustment.

It is thus evident that the instant of application and of cessation of the blow-back, its prolongation, the volume of fluid under pressure constituting the same and the pressure of the fluid may be nicely adjusted.

The blow-back is employed for any or all of a number of purposes. Thus it may be used to elevate the sheared stub up within the outlet into a zone of remelting heat to eliminate by melting the chilled and hardened end left by the shears. Again it provides the "dwell" or intervals between mold charge-forming operations, to permit the removal of the charged mold and the substitution of an empty mold. Moreover the quantity of glass forming the mold charge may be regulated by adjusting the blow-back as the inception of the outflow or extrusion for the next charge may be thus hastened or delayed.

In Fig. 9 I have shown convenient and practical means for the automatic operation of the shears. Thus I have shown the front and rear ends of the cylinder 52 connected by the pipes 82 and 83, respectively, to the double-acting control valve 84 which when thrown in one direction connects one end of the cylinder to pressure and the other to relief, and when thrown in the opposite direction connects the first named end of the cylinder to relief and the second named end to pressure, the valve being actuated by a suitable timer device. Thus in Fig. 9 I have indicated the control valve 84 and a timer 85, the valve and timer being of the types illustrated in Letters Patent of the United States No. 1,540,894, issued to me on June 9th, 1925. As will be understood by reference to said Letters Patent, the timer is adjustable so that the inception of admission of pressure to either end of the cylinder and its relief from the opposite end may be regulated to occur at any desired instant relative to the operation of the machine.

In the use of the blow-back, leakage of pressure at the lower end of the outlet is likely to occur. For instance, closed shear blades may not maintain perfect sliding contact, or foreign substances, such as pebbles or grains of sand or dirt or threads of chilled glass may intervene between the blades. In such cases the proper fluid pressure is hard to maintain.

I avoid such difficulties by employing a slightly higher pressure and excess volume of fluid in the tank 29 and the pipe 22 to supply the chamber 14, thus compensating for accidental loss, such as described. To control this excess pressure and volume I provide an adjustable blow-off valve 86 which is connected by a pipe 87 with a horizontal passage 88 in the plate 9 connected at its inner end to the chamber 14. Thus in case leakage does not reduce the excess pressure and volume to the desired points, the automatic blow-off valve, which is set to relieve pressure and volume in excess of that desired, will operate to bring the fluid pressure and volume of the blow-back down to that predetermined.

But one depending standard 60 may be used for supporting the housing 59 from above, the said standard being in the same relative position as the standard 75 at the other side shown in Fig. 1 as supporting the bracket 74. It is evident that the entire shear mechanism may be assembled in a reversed position and be mounted with the standard 75 supporting the housing 59 and the standard 60 supporting the bracket 74, another standard 53 being provided at the other side to support the cylinder 52 in its new position.

What I desire to claim is:—

1. In apparatus for use with an outlet for the discharge of molten glass for producing mold charges, the combination of shear blades mounted for reciprocation towards and away from each other, a single fluid-pressure cylinder mechanism, direct operative connection between one of said blades and the piston rod of said fluid-pressure cylinder mechanism and indirect operative connection between the other blade and said fluid-pressure cylinder mechanism whereby said blades are simultaneously moved in alinement with each other and in opposite directions.

2. In apparatus for use with an outlet for the discharge of molten glass for producing mold charges, the combination of shear blades mounted for reciprocation towards and away from each other and in alinement with each other, a single fluid-pressure cylinder mechanism, the piston rod of said fluid-pressure mechanism being directly coupled to one of said blades to reciprocate the same, and indirect connections between the other blade and the fluid-pressure cylinder mechanism whereby a reverse reciprocation is imparted to the other blade.

3. In apparatus for use with an outlet for the discharge of molten glass for producing mold charges, the combination of shear blades mounted for reciprocation towards and away from each other and in alinement with each other, a single fluid pressure cylinder mechanism, direct connections between one of said blades and the piston rod of the fluid-pressure cylinder mechanism, and indirect connections, including a rack and pinion device, between said piston rod and the other blade, whereby said blades are simultaneously reciprocated in opposite directions.

4. In apparatus for use with an outlet for the discharge of molten glass for producing mold charges, the combination of shear blades mounted for reciprocation towards and away from each other, a fluid-pressure cylinder mechanism, one of said blades being connected to the piston rod of said fluid-pressure cylinder mechanism to reciprocate therewith, and a rack and pinion device connecting the piston rod to the other blade, whereby an opposite reciprocation is imparted to the latter.

5. In apparatus for use with an outlet for the discharge of molten glass for producing mold charges, the combination of shear blades mounted for reciprocation towards and away from each other, a fluid-pressure cylinder mechanism, one of said blades being connected to the piston rod of said fluid-pressure cylinder mechanism to reciprocate therewith, a pinion rotated by the movement of said piston rod, and a rack-bar meshed with said pinion and connected to the other blade whereby an opposite reciprocation is imparted to the latter.

6. In apparatus for use with an outlet for the discharge of molten glass for producing mold charges, the combination of shear blades mounted for reciprocation towards and away from each other, a fluid-pressure cylinder mechanism, one of said blades being connected to the piston rod of said fluid-pressure cylinder mechanism to reciprocate therewith, a rack-bar moving with said piston, a pinion meshing with said rack-bar, and a second rack-bar meshing with said pinion in a manner the reverse of the meshing of the first mentioned rack-bar, and connection between the said rack-bar and the other blade whereby said second mentioned blade is reciprocated in a manner opposite to the reciprocation of the first mentioned blade.

7. In apparatus for use with an outlet for the discharge of molten glass for producing mold charges, the combination of a pair of shear blades mounted for reciprocation towards and away from each other and in alinement with each other, means directly connected to one of said shear blades to impart reciprocal motion thereto, and indirect connection between said directly connected means and the other shear blade whereby a reverse reciprocation is imparted to the latter.

8. In apparatus for use with an outlet for the discharge of molten glass for producing mold charges, the combination of a pair of shear blades mounted for reciprocation towards and away from each other, means directly connected to one of said shear blades to impart reciprocal motion thereto, and connection including a rack-bar and pinion device interposed between said means and the other shear blade to impart an opposite reciprocal motion to the latter.

9. In apparatus for use with an outlet for the discharge of molten glass for producing mold charges, the combination of a pair of shear blades mounted for reciprocation towards and away from each other, means directly connected to one of said shear blades to impart reciprocal motion thereto, a rack-bar moving with said means, a pinion meshed with said rack-bar and rotated thereby, and a second rack-bar operatively connected to the other shear blade and meshing with said pinion in opposition to the first named rack-bar whereby a reciprocal motion opposite to that of the first mentioned shear blade is imparted to the second mentioned shear-blade.

10. In apparatus for use with an outlet for the discharge of molten glass for producing mold charges, the combination of a pair of shear-blades mounted below the outlet and arranged for reciprocation in alinement with each other and toward and away from each other, fluid-pressure cylinder and piston mechanism connected with said shear-blades to reciprocate the same, and compressible means whereby when said blades are in their closed relation they complete a closure for the lower end of the outlet.

11. In apparatus for use with an outlet for the discharge of molten glass for producing mold charges, the combination of a pair of shear-blades mounted below the outlet and arranged for reciprocation in alinement with each other and toward and away from each other, fluid-pressure cylinder and piston mechanism connected with said shear-blades to reciprocate the same, the outlet being provided with a depending inclosing wall, and means mounted to move with the shear-blades and arranged to engage said wall from without to complete the closure of the lower end of the outlet when the shear-blades are in their closed relation.

12. In apparatus for use with an outlet for the discharge of molten glass for producing mold charges, the combination of a pair of shear blades mounted below the outlet and arranged for reciprocation in alinement with each other and toward and away from each other, a fluid-pressure cylinder and piston mechanism operatively connected with both of said shear-blades to reciprocate the latter, the outlet being provided with a depending inclosing wall, and means moving with the shear blades and arranged to compressively engage said wall from without whereby when the shear-blades are in their closed relation a closure is formed for the lower end of the outlet.

13. In apparatus for use with an outlet for the discharge of molten glass for producing mold charges, the combination of shear blades mounted for reciprocation toward and away from each other below the outlet, means for admitting fluid pressure to the lower end of said outlet when the shears are in their closed position, and means for enclosing the lower end of the outlet to prevent the escape of fluid pressure when the shears are closed.

14. In apparatus for use with an outlet for the discharge of molten glass for producing mold charges, the combination of shear blades mounted for reciprocation toward and away from each other below the outlet, means for admitting fluid pressure to the lower end of said outlet when the shears are in their closed position, and means moving with the shear blades for enclosing the lower end of the outlet to prevent the escape of fluid pressure when the shears are closed.

15. In apparatus for use with an outlet for the discharge of molten glass for producing mold charges, the combination of a pair of blade holders mounted to reciprocate toward and away from each other beneath the outlet, the holders being provided with arcuate portions which coact to embrace the lower end of the outlet when the holders are in the converged positions, and blades carried by said holders and coacting when the shears are closed to form with said arcuate portions a closure for the lower end of the outlet.

16. In apparatus for use with an outlet for the discharge of molten glass for producing mold charges, the combination of a pair of blade holders mounted to reciprocate toward and away from each other beneath the outlet, the holders being provided with arcuate portions which coact to embrace the lower end of the outlet when the holders are in the converged positions, blades carried by said holders and coacting when the shears are closed to form with said arcuate portions a closure for the lower end of the outlet, and means for admitting compressed air to said outlet when the shears are closed.

17. In shear mechanism for cutting a column of molten glass, a pair of shear blades mounted to reciprocate toward and from each other, said blades having V-shaped cutting edges and assuming an overlapping relation when closed together, the adjacent surfaces of said blades being laterally convexed so that a compressive contact is maintained between the cutting edges during the converging movement of said blades, and spring-means at either side of the blades compressing the blades together.

18. In shear mechanism for cutting a column of molten glass, a pair of shear blades mounted to reciprocate toward and from each other, said blades having V-shaped cutting edges and assuming an overlapping relation when closed together, the adjacent surfaces of said blades being laterally convexed so that a compressive contact is maintained between the cutting edges during the converging movement of said blades, and spring-means at either side of the blades compressing the blades together, said means being arranged so that the maximum compression between the cutting edges is maintained on a line at right angles to the plane of movement of the blades and intersecting the axis of the column of glass.

19. In shear mechanism for cutting a column of molten glass, a pair of shear blades mounted to reciprocate toward and from each other, said blades having V-shaped cutting edges and assuming an overlapping relation when closed together, the adjacent surfaces of said blades being laterally convexed so that a compressive contact is maintained between the cutting edges during the converging movement of said blades, and leaf-springs carried at either side of each of said blades, and moving therewith, the opposing leaf-springs engaging in sliding contact as the shears close.

20. In shear mechanism for cutting a column of molten glass, a pair of shear blades mounted to reciprocate toward and from each other, said blades having V-shaped cutting edges and assuming an overlapping relation when closed together, the adjacent surfaces of said blades being laterally convexed so that a compressive contact is maintained between the cutting edges during the converging movement of said blades, leaf-springs carried at either side of each of said blades and moving therewith, the opposing leaf-springs engaging in sliding contact as the shears close, and said leaf-springs being curved away from each other so as to exert their maximum compression in a line at right angles to the plane of movement of the blades and intersecting the axis of the column of glass.

21. In combination with the boot or shallow extension of a tank or other container for molten glass, which is provided with an opening in its bottom, a liner comprised of a clay bushing inserted in said opening, a metal plate detachably secured to the under surface of the floor of the boot and having an opening whose perimetral edge overlaps the lower end of the liner to hold it in position, an orifice bushing removably secured in the opening and having its bore registering with the bore of said lining.

22. In combination with the boot or shallow extension of a tank or other container for molten glass, which is provided with an opening in its bottom, a liner comprised of a clay bushing inserted in said opening, a metal plate detachably secured to the under surface of the floor of the boot and having an opening whose perimetral edge overlaps the lower end of the liner to hold it in position, an orifice bushing inserted in the opening in said plate and having its bore registering with the bore of said lining, and means for removably securing said bushing in place.

23. In combination with the boot or shallow extension of a tank or other container for molten glass, which is provided with an opening in its bottom, a liner comprised of a clay bushing inserted in said opening, a metal plate detachably secured to the under surface of the floor of the boot and having an opening whose perimetral edge overlaps the lower end of the liner to hold it in position, an orifice bushing inserted in the opening of said plate, and spring-ring means for holding said bushing removably in place.

24. A discharge orifice structure for the boot or shallow extension of a tank or other container for molten glass comprising a clay liner inserted in the discharge opening of the boot or container, a metal plate detachably secured in place and supporting said liner from below, said plate having an opening with its axis alined with the axis of said liner, and an orifice bushing removably inserted in the opening of said plate and having its bore registering with the bore of the liner.

25. A discharge orifice structure for the boot or shallow extension of a tank or other container for molten glass comprising a clay liner inserted in the discharge opening of the boot or container, a metal plate detachably secured in place and supporting said liner from below, said plate having an opening with its axis alined with the axis of said liner, an orifice bushing removably inserted in the opening of said plate and having its bore registering with the bore of the liner, and means for detachably holding the bushing in position.

26. A discharge orifice structure for the boot or shallow extension of a tank or other container for molten glass comprising a clay liner inserted in the discharge opening of the boot or container, a metal plate detachably secured in place and supporting said liner from below, said plate having an opening whose perimetral edge overlaps and supports the liner and said opening being intermediately grooved out and the lower end of said opening being threaded, a ring nut screwed into said opening and completing with said groove to form an annular chamber, and an orifice bushing detachably mounted in said ring nut and said opening and having its bore registering with the bore of said liner.

27. A discharge orifice structure for the boot or shallow extension of a tank or other container for molten glass comprising a clay liner inserted in the discharge opening of the boot or container, a metal plate detachably secured in place and supporting said liner from below, said plate having an opening whose perimetral edge overlaps and supports the liner and said opening being intermediately grooved out and the lower end of said opening being threaded, a ring nut screwed into said opening and completing with said groove to form an annular chamber, an orifice bushing detachably mounted in said ring nut and said opening and having its bore registering with the bore of said liner, and means for securing said bushing removably in place.

28. A discharge orifice structure for the boot or shallow extension of a tank or other container for molten glass comprising a clay liner inserted in the discharge opening of the boot or container, a metal plate detachably secured in place and supporting said liner from below, said plate having an opening whose perimetral edge overlaps and supports the liner and said opening being intermediately grooved out and the lower end of said opening being threaded, a ring nut screwed into said opening and completing with said groove to form an annular chamber, an orifice bushing detachably mounted in said ring nut and said opening and having its bore registering with the bore of said liner, and a spring ring seated in a groove in the bore of said ring nut and supporting said bushing from below.

29. In combination with a discharge orifice structure for the boot or shallow extension of a tank or other container for molten glass comprising a clay liner inserted in the discharge opening of the boot or container, a metal plate detachably secured in place and having an opening with its axis alined with the axis of the liner, the perimetral edge of said opening supporting said liner from below, the lower end of said plate opening being of greater diameter and threaded, a ring nut screwed up into said opening, the intermediate portion of said opening being grooved out to complete an annular chamber with said ring nut, an orifice bushing removably held in the opening of said plate and in said ring-nut with its bore registering with the bore of said liner, vertical ports connecting said chamber with the lower end of the bushing, means including a valve for supplying compressed air to said chamber, shears adapted to close below said bushing, and means whereby when said shears close said valve is opened to admit compressed air to said annular chamber.

30. In combination with a discharge orifice structure for the boot or shallow extension of a tank or other container for molten glass comprising a clay liner inserted in the discharge opening of the boot or container, a metal plate detachably secured in place and having an opening with its axis alined with the axis of the liner, the perimetral edge of said opening supporting said liner from below, the lower end of said plate opening being of greater diameter and threaded, a ring nut screwed up into said opening, the intermediate portion of said opening being grooved out to complete an annular chamber with said ring nut, an orifice bushing removably held in the opening of said plate and in said ring nut with its bore registering with the bore of said liner, vertical ports connecting said chamber with the lower end of the bushing, means including a valve for supplying compressed air to said chamber, shears arranged to close below said bushing and when closed to form a closure for the lower end thereof, and means whereby when said shears close said valve is opened.

31. In combination with a discharge orifice structure for the boot or shallow extension of a tank or other container for molten glass comprising a clay liner inserted in the discharge opening of the boot or container, a metal plate detachably secured in place and having an opening with its axis alined with the axis of the liner, the perimetral edge of said opening supporting said liner from below, the lower end of said plate opening being of greater diameter and threaded, a ring nut screwed up into said opening, the intermediate portion of said opening being grooved out to complete an annular chamber with said ring nut, an orifice bushing removably held in the opening of said plate and in said ring nut with its bore registering with the bore of said liner, vertical ports connecting said chamber with the lower end of the bushing, means including a valve for supplying compressed air to said chamber, shears adapted to close below said bushing, means whereby when said shears close said valve is opened to admit compressed air to said annular chamber, and an adjustable blow-off valve connected to said annular chamber to relieve excess pressure therefrom.

32. In combination with a discharge orifice structure for the boot or shallow extension of a tank or other container for molten glass comprising a clay liner inserted in the discharge opening of the boot or container, a metal plate detachably secured in place and having an opening with its axis alined with the axis of the liner, the perimetral edge of said opening supporting said liner from below, the lower end of said plate opening being of greater diameter and threaded, a ring nut screwed up into said opening, the intermediate portion of said opening being grooved out to complete an annular chamber with said ring nut, an orifice bushing removably held in the opening of said plate and in said ring nut with its bore registering with the bore of said liner, vertical ports connecting said chamber with the lower end of the bushing, means including a valve for supplying compressed air to said chamber, shears arranged to close below said bushing and when closed to form a closure for the lower end thereof, means whereby when said shears close said valve is opened, and an adjustable blow-off valve connected to said annular chamber to relieve excess pressure therefrom.

33. In apparatus for producing mold charges of molten glass, the combination with the discharge outlet of the boot or shallow extension of a tank or other container for molten glass, of shear means arranged to cut at intervals the glass discharged from said outlet, said shear-means when in cutting position forming a bottom closure for said orifice, means for introducing fluid-pressure into the lower portion of said outlet, when the shear means are in cutting position, to support the sheared stub, and means for preventing excess in said fluid pressure.

34. In apparatus for producing mold charges of molten glass, the combination with the discharge outlet of the boot or shallow extension of a tank or other container for molten glass, of shear means arranged to cut at intervals the glass discharged from said outlet, said shear means when in cutting position forming a bottom closure for said orifice, means for introducing fluid-pressure into the lower portion of said outlet, when the shear means are in cutting position, to support the sheared stub, and adjustable means for preventing excess in said fluid pressure.

35. In apparatus for producing mold charges of molten glass, the combination with the discharge outlet of the boot or shallow extension of a tank or other container for molten glass, of shear-means arranged to cut at intervals the glass discharged from said outlet, said shear means when in cutting position forming a bottom closure for said orifice, means for introducing fluid-pressure into the lower portion of said outlet, when the shear means are in cutting position, to support the sheared stub, and blow-off means to prevent excess fluid-pressure.

36. In apparatus for producing mold charges of molten glass, the combination with the discharge outlet of the boot or shallow extension of a tank or other container for molten glass, of shear means arranged to cut at intervals the glass discharged from said outlet, said shear means when in cutting position forming a bottom closure for said orifice, means for introducing fluid-pressure into the lower portion of said outlet, when the shear means are in cutting position, to support the sheared stub, and adjustable blow-off means to prevent excess fluid-pressure.

37. In shear-mechanism for severing mold charges of molten glass, the combination of a bed plate, guide bars attached to said bed plate to form a slideway, a pair of blade-holders mounted to reciprocate in said slideway toward and away from each other, and means whereby the bars forming one side of said slideway may be moved out of position to facilitate the insertion or removal of the blade-carriers.

38. In shear-mechanism for severing mold charges of molten glass, the combination of a bed plate, guide bars attached to said bed plate to form a slideway, a pair of blade-holders mounted to reciprocate in said slideway toward and away from each other, and means whereby the bars forming one of the sides of said slideway may be swung out of position to facilitate the insertion or removal of the blade-holders.

39. In apparatus for producing mold charges of molten glass, the combination with a receptacle for the molten glass having a submerged discharge outlet, of a wall inclosing the outlet and depending below the receptacle, shears arranged to close at intervals beneath the outlet to sever the masses of glass depending from the outlet and form a closure below the outlet, means moving with the shears and arranged to surround said wall when the shears are closed, and a compressible packing means interposed between said first mentioned means and said wall.

40. In apparatus for producing mold charges of molten glass, the combination with a receptacle for the molten glass having a submerged discharge outlet, of a wall inclosing the outlet and depending below the receptacle, shears arranged to close at intervals beneath the outlet to sever the masses of glass depending from the outlet, means moving with the shears and arranged to surround said wall when the shears are closed, and compressible packing carried by said wall and engaged by said means when the shears are closed to complete the enclosure of the lower end of the outlet.

41. In apparatus for producing mold charges of molten glass, the combination with a receptacle for the molten glass having a submerged discharge outlet, of a wall inclosing the outlet and depending below the receptacle, shears arranged to close at intervals beneath the outlet to sever the masses of glass depending from the outlet and form a closure below the outlet, means moving with the shears and arranged to surround said wall when the shears are closed, and split-ring packing interposed between said wall and said means to complete the enclosure of the lower end of the outlet.

Signed at Pittsburgh, Pa., this 15th day of December, 1925.

WILLIAM J. MILLER.